US009872196B2

(12) United States Patent
Proctor, Jr. et al.

(10) Patent No.: US 9,872,196 B2
(45) Date of Patent: *Jan. 16, 2018

(54) SUBSCRIBER-CONTROLLED REGISTRATION TECHNIQUE IN A CDMA SYSTEM

(71) Applicant: IPR Licensing, Inc., Wilmington, DE (US)

(72) Inventors: James A. Proctor, Jr., Indiatlantic, FL (US); Dennis D. Ferguson, Orlando, FL (US)

(73) Assignee: IPR Licensing, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/245,981

(22) Filed: Aug. 24, 2016

(65) Prior Publication Data

US 2016/0366609 A1    Dec. 15, 2016

Related U.S. Application Data

(63) Continuation of application No. 14/071,183, filed on Nov. 4, 2013, now Pat. No. 9,456,376, which is a
(Continued)

(51) Int. Cl.
*H04B 7/216* (2006.01)
*H04W 28/02* (2009.01)
(Continued)

(52) U.S. Cl.
CPC ...... *H04W 28/0231* (2013.01); *H04B 17/318* (2015.01); *H04L 5/006* (2013.01);
(Continued)

(58) Field of Classification Search
CPC ..... H04W 48/06; H04W 48/20; H04W 48/10; H04W 28/0231; H04B 17/318; H04L 5/0051; H04L 5/0053; H04L 5/006
(Continued)

(56) References Cited

U.S. PATENT DOCUMENTS 4,866,709 A * 9/1989 West .................. H04L 47/10
370/314
5,251,205 A * 10/1993 Callon .................. H04L 29/06
370/392
(Continued)

FOREIGN PATENT DOCUMENTS

| EP | 0 472 349 | 2/1992 |
| EP | 0 762 792 | 3/1997 |
| WO | 97/33448 | 9/1997 |

OTHER PUBLICATIONS

TIA/EIA Interim Standard, Mobile Station-Base Station Compatibility Standard for Dual-Mode Wideband Spread Spectrum Cellular System, TIA/EIA/IS-95 (Jul. 1993).
(Continued)

*Primary Examiner* — Thai Hoang
(74) *Attorney, Agent, or Firm* — Volpe and Koenig, P.C.

(57) ABSTRACT

A method and apparatus for dynamic uplink communication in a wireless communication system are disclosed herein. The method includes receiving, by the mobile station, a first channel from a first base station, wherein the first channel includes an indication, wherein the indication has one of two states, wherein the base station transmits on forward link channels including a pilot channel, traffic channels and the first channel. The method also includes receiving, by the mobile station, a communication from the first base station on a condition that the indication has a first state of the two states, and selecting, by the mobile station, a second base station based on received pilot signals from a plurality of
(Continued)

base stations on a condition that the indication has a second state of the two states.

17 Claims, 3 Drawing Sheets

Related U.S. Application Data continuation of application No. 11/454,614, filed on Jun. 16, 2006, now Pat. No. 8,576,805, which is a continuation of application No. 10/435,927, filed on May 12, 2003, now Pat. No. 7,072,316, which is a continuation of application No. 09/301,483, filed on Apr. 28, 1999, now Pat. No. 6,563,809.

(51) Int. Cl.
  *H04W 48/06* (2009.01)
  *H04W 48/20* (2009.01)
  *H04B 17/318* (2015.01)
  *H04L 5/00* (2006.01)
  *H04W 48/10* (2009.01)

(52) U.S. Cl.
  CPC .......... *H04L 5/0051* (2013.01); *H04L 5/0053* (2013.01); *H04W 48/06* (2013.01); *H04W 48/20* (2013.01); *H04W 48/10* (2013.01)

(58) Field of Classification Search
  USPC ............ 370/328–350, 449, 457, 232–237; 455/146–150, 152, 506–515
  See application file for complete search history.

(56) References Cited

U.S. PATENT DOCUMENTS

| | | | |
|---|---|---|---|
| 5,353,332 A | 10/1994 | Raith et al. | |
| 5,416,797 A | 5/1995 | Gilhousen et al. | |
| 5,454,026 A * | 9/1995 | Tanaka ................. | H04W 36/30 455/437 |
| 5,530,917 A | 6/1996 | Andersson et al. | |
| 5,537,395 A | 7/1996 | Alles et al. | |
| 5,570,353 A | 10/1996 | Keskitalo et al. | |
| 5,574,973 A | 11/1996 | Borth et al. | |
| 5,799,254 A * | 8/1998 | Karmi ................... | H04W 28/08 455/401 |
| 5,859,839 A | 1/1999 | Ahlenius et al. | |
| 5,903,554 A | 5/1999 | Saints | |
| 5,982,758 A | 11/1999 | Hamdy | |
| 6,021,123 A | 2/2000 | Mimura | |
| 6,108,307 A * | 8/2000 | McConnell ......... | H04L 12/2854 370/235 |
| 6,115,750 A * | 9/2000 | Dillon ................ | H04B 7/18582 370/235 |
| 6,222,839 B1 | 4/2001 | Nakazaki et al. | |
| 6,351,459 B1 | 2/2002 | Kondo | |
| 6,366,588 B1 | 4/2002 | Gans et al. | |
| 6,374,112 B1 | 4/2002 | Widegren | |
| 6,389,034 B1 * | 5/2002 | Guo ....................... | H04B 7/264 370/441 |
| 6,393,003 B1 * | 5/2002 | Lee ....................... | H04W 36/18 370/331 |
| 6,563,809 B1 * | 5/2003 | Proctor, Jr. ........... | H04W 48/06 370/335 |
| 6,697,378 B1 * | 2/2004 | Patel ..................... | H04W 28/10 370/328 |
| 6,747,965 B1 | 6/2004 | Nara et al. | |
| 6,788,952 B1 * | 9/2004 | Jokimies ............... | H04W 48/20 370/337 |
| 6,947,748 B2 | 9/2005 | Li et al. | |
| 7,072,316 B2 * | 7/2006 | Proctor, Jr. ........... | H04W 48/06 370/331 |
| 7,319,673 B1 * | 1/2008 | Briscoe .................. | H04L 12/14 370/252 |
| 8,576,805 B2 * | 11/2013 | Proctor, Jr. ........... | H04W 48/06 370/229 |
| 9,456,376 B2 * | 9/2016 | Proctor, Jr. ........... | H04W 48/06 |
| 2001/0028638 A1 | 10/2001 | Walton et al. | |
| 2005/0136937 A1 | 6/2005 | Qian et al. | |
| 2006/0166677 A1 | 7/2006 | Derakshan et al. | |

OTHER PUBLICATIONS

Telecommunications Industry Association, "TIA/EIA Interim Standard, Mobile Station-Base Station Compatibility Standard for Dual-Mode Wideband Spread Spectrum Cellular System, TIA/EIA/IS-95-A (Revision of TIA/EIA/IS-95)," (May 1995), (Due to the size of this document, it is submitted in 3 parts).

Telecommunications Industry Association, "TIA/EIA Standard, Mobile Station-Base Station Compatibility Standard for Wideband Spread Spectrum Cellular Systems, TIA/EIA-95B (Upgrade and Revision of TIA/EIA-95A)," (Mar. 1999).

* cited by examiner

100

1000

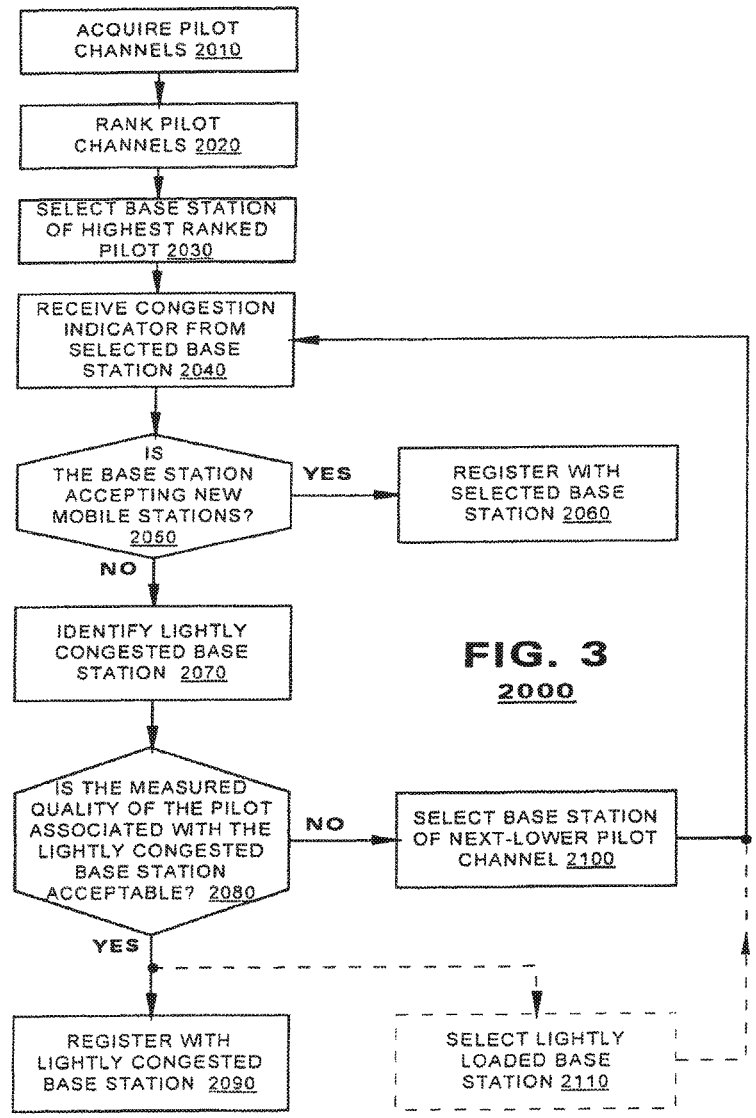

SUBSCRIBER-CONTROLLED REGISTRATION TECHNIQUE IN A CDMA SYSTEM

CROSS REFERENCE TO RELATED APPLICATIONS

This application is a continuation of U.S. application Ser. No. 14/071,183 filed on Nov. 4, 2013, which is a continuation of U.S. application Ser. No. 11/454,614, filed Jun. 16, 2006, which issued as U.S. Pat. No. 8,576,805 on Nov. 5, 2013, which is a continuation of U.S. application Ser. No. 10/435,927, filed May 12, 2003 which issued as U.S. Pat. No. 7,072,316 on Jul. 4, 2006, which is a continuation of U.S. application Ser. No. 09/301,483, filed Apr. 28, 1999, which issued as U.S. Pat. No. 6,563,809 on May 13, 2003. The entire teachings of the above applications are incorporated herein by reference.

BACKGROUND

The present invention provides a subscriber-implemented registration technique for use in a CDMA communication system to uniformly distribute subscriber load among base stations.

Typically in a CDMA system, when a subscriber terminal ("mobile station") begins operation, it registers with a base station as part of its initialization operation. As part of registration, the mobile station typically identifies a pilot channel of a base station and communicates with the base station to identify the mobile station's presence in the base station's cell. The mobile station typically transmits a registration request message on an access channel associated with the base station or its pilot channel. When multiple pilot channels are detected, the mobile station typically registers with the base station whose pilot channel is associated with a highest quality reception.

As is known, CDMA communication systems are "interference limited." Unless determined by a communication protocol, a base station is not characterized by a fixed number of communication channels by which it may communicate user data to mobile stations. In theory, a "congested" base station may continue to add communication channels to satisfy increased demand for service, but the communication quality of each channel in the system would be diminished incrementally. In practice, the number of channels that may be satisfied by a base station is determined by minimum call quality standards that are to be maintained by the communication system. As is known, this number of channels also may be affected by environmental conditions in the cell that may contribute to quality degradations. However, it is desirable to limit unnecessary communication in a congested CDMA cell to improve the call quality of communication channels already in process and to reduce undesirable cross-channel interference.

In traditional CDMA systems, a mobile station will attempt to register with a base station based solely on the mobile station's measurement of the received signal strength, $E_c/I_o$ or SNR of the pilot channels. Although provisions exist in some CDMA systems for base stations to refuse to register a mobile station based upon congestion levels of the base station, registration in such systems typically includes a first transmitted registration request message from the mobile station to the congested based station followed by a second transmitted message from the congested base station to the mobile station denying registration. The mobile station then would attempt to register with the base station associated with the next strongest pilot channel. And, in systems employing soft handoff, if the mobile station succeeds in registering with the next strongest base station, the mobile station may retry registration with the congested base station upon expiration of a countdown timer.

The registration request and denial transmissions that are used in these traditional CDMA systems consume precious bandwidth in an already-congested base station. They contribute to cross-channel interference with other channels already in progress and further consume processing resources in the already-congested base station. Accordingly, there is a need in the art for a low bandwidth registration protocol In a CDMA system, one that reduces processing demands upon a base station operating in a congested state.

SUMMARY

A method and apparatus for dynamic uplink communication in a wireless communication system are disclosed herein. The method includes receiving, by the mobile station, a first channel from a first base station, wherein the first channel includes an indication, wherein the indication has one of two states, wherein the base station transmits on forward link channels including a pilot channel, traffic channels and the first channel. The method also includes receiving, by the mobile station, a communication from the first base station on a condition that the indication has a first state of the two states, and selecting, by the mobile station, a second base station based on received pilot signals from a plurality of base stations on a condition that the indication has a second state of the two states.

BRIEF DESCRIPTION OF THE DRAWINGS

FIG. 3 is a flow diagram of a mobile station operating in accordance with a second embodiment of the present invention.

DETAILED DESCRIPTION

The present invention relates to a registration technique for use in CDMA communication systems in which a mobile station determines which of a plurality of base stations it will register with. The mobile station makes its decision based on loading indicators transmitted globally from a base station to subscriber stations.

Figure 1:
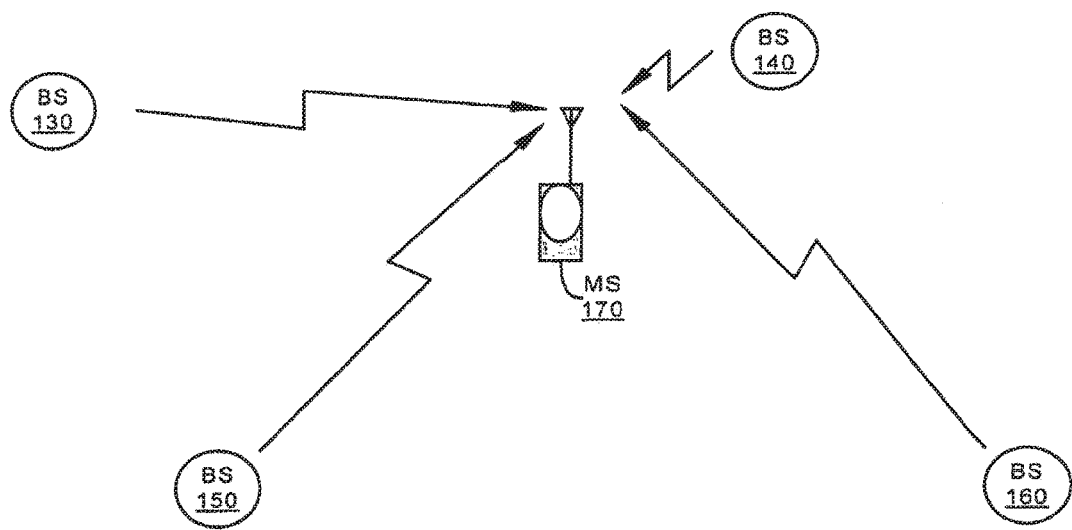
FIG. 1 illustrates a CDMA communication system.

FIG. 1 illustrates a typical CDMA communication system 100. The communication system may be populated by a plurality of base stations 100-160. The base stations 100-160 communicate with a plurality of mobile stations such as the mobile station 170 shown in FIG. 1. Each base station typically broadcasts a plurality of logical channels on a physical channel including a pilot channel, a "sync" channel, a paging channel and a plurality of traffic channels.

As is known, the pilot channel may be thought of as a "beacon" transmitted from a base station. Typically, the pilot channel constitutes a data signal having a predetermined pattern. The pilot channel typically carries no information. Mobile stations use the pilot channel on initialization to acquire carrier phase and timing relationships. Often, the same CDMA code that identifies the pilot channel of a first base station also is used to identify the pilot channel of other base stations. However, in such systems, neighboring base stations transmit the CDMA code using predetermined delay offsets with respect to each other that provide clear discrimination between base stations. However, the predetermined delay relationships of adjacent pilot channels permit a mobile station to quickly acquire the pilot channels of adjacent base stations once it has acquired the pilot channels of a first base station.

A sync channel may be used by the base station to communicate administrative information to a mobile station. For example, a base station may transmit a base station ID to a user, a color code and administrative information identifying system status. Sync channels are transmitted globally within the cell; typically, mobile stations that are idle (are not engaged in active communication connections) monitor the sync channel.

Each base station may transmit one or more paging channels. Paging channels typically are used to command a mobile station to set up traffic channels. Traffic channels may carry user data to mobile stations when the mobile stations participate in active communication connections.

According to the principles of the present invention, the communication protocol of the sync channel may be modified to include a congestion indicator signal that identifies whether the base station is operating in a congested state. In a first simplest embodiment, the congestion indicator field simply may include a flag signal. When the base station is not operating in a congested state, the flag signal may be set to a first predetermined state indicating that a mobile station may attempt to register with the base station. When the base station is operating in a congested state, the flag signal may be set to a second predetermined state indicating that the mobile station should not attempt to register with the base station.

Figure 2:
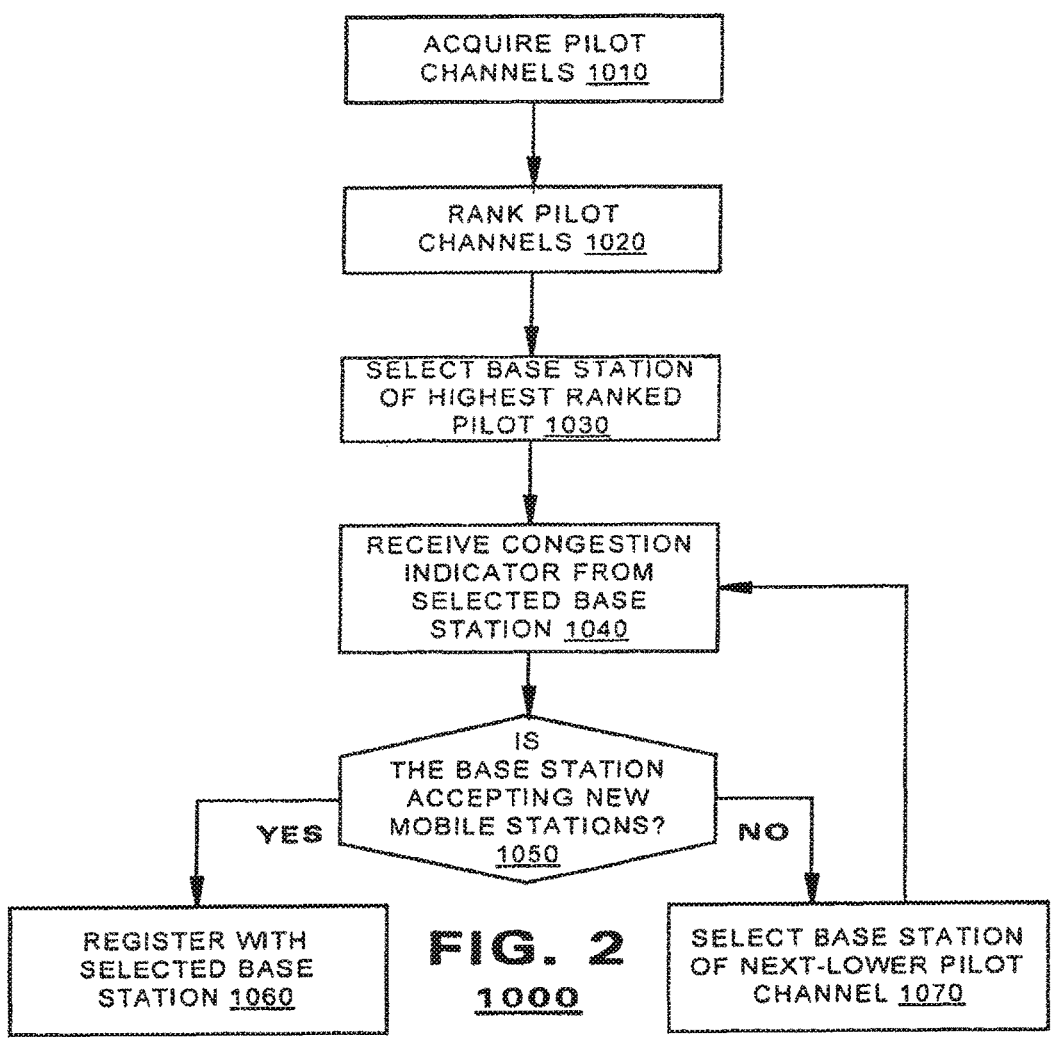
FIG. 2 is a flow diagram of a mobile station operating in accordance with a first embodiment of the present invention.

According to this first embodiment of the present invention, mobile stations may register in accordance with the method 1000 illustrated in FIG. 2. Upon start up, a mobile station 170 typically monitors received transmissions and searches for pilot channels of neighboring base stations (Step 1010). The number and identity of detected pilot channels may depend upon the topology of the system, the mobile station's location therein, and environmental conditions. Typically, when it detects a pilot channel from a first base station, a mobile station may exploit the predetermined timing offsets among the pilot channels in the system to facilitate acquisition of the pilot channels from other base stations. Depending upon ambient conditions, a mobile station may not detect pilot channels from all the base stations in a system. These are known characteristics of conventional CDMA systems.

The mobile station may rank the base stations based upon the quality of the detected pilot channels (Step 1020). As a first indicator of quality, the mobile station may rank the base stations based upon a received power level associated with each pilot channel, called the 11 received signal strength indicator" (or "RSSI") in connection with some known CDMA systems. Alternatively, the mobile station may rank the base stations based upon a measured bit error rate ("BER") for the pilot channels. Further, the ranking of base stations may be made on the basis of ratios of energy per chip to aggregate received energy (commonly represented as $E_c/I_o$). And, of course, the ranking may be performed based upon some combination of RSSI and BER and $E_c/I_o$ measurements.

The mobile station selects the base station that was ranked highest in pilot quality (Step 1030). It monitors the sync channel to acquire the congestion indicator signal (Step 1040) and determines whether the flag signal therein indicates that the base station is accepting additional registrations from mobile stations (Step 1050). If the base station is accepting new registrations, the mobile station attempts to register with the selected base station (Step 1060). If not, the mobile station selects the base station that appears next in its ranking of pilot quality (Step 1070). Thereafter, it returns to step 1040, monitors that congestion indicator signal from the newly selected base station and determines whether to register to it.

Theoretically, if severe loading conditions were present throughout a given system 100, it is possible that a mobile station would cycle infinitely through a loop created by traversing steps 1040-1050 and 1070, then returning again to step 1040. According to an embodiment of the present invention, a mobile station may be programmed to discontinue the method of FIG. 2 if it cycles through steps 1040-1050 and 1070 a predetermined number of times without identifying a base station that will accept new registrations. Alternatively, the mobile station may be configured to discontinue the method of FIG. 2 if, at step 1070, the mobile station selects a base station that is associated with pilot quality that is below a predetermined call quality threshold established for the system. As another alternative, the mobile station may interrupt the loop of steps 1040-1050 and 1070 if it traverses the entire set of pilot channels acquired at Step 1010.

Registration as represented in Step 1060 may be accomplished according to any of a number of well-known registration schemes and may include additional functionality not discussed herein.

In an alternate embodiment of the system 100, base stations may be configured to broadcast congestion indicator signals that report not only whether the transmitting base station is in a congested state but also identify a neighboring base station that is operating in a lightly congested state. In such an embodiment, registration of a mobile station may operate in accordance with the method 2000 of FIG. 3.

According to the method 2000, a mobile station acquires pilot channels, ranks the pilot channels and monitors congestion indicator signals as is described above with respect to Steps 1010-1050 in FIG. 2 (Steps 2010-2050). If the highest quality base station is accepting registrations of new mobile stations, the mobile station registers with the base station (Step 2060).

If the base station is operating in a congested state and is not accepting new registrations from mobile stations, the mobile station identifies a lightly loaded base station from the congestion indicator signal transmitted by the congested base station (Step 2070). The mobile station may determine if the measured pilot quality of the lightly loaded base station exceeds minimum call quality thresholds for the system (Step 2080). If so, the mobile station registers with the lightly loaded base station (Step 2090). Otherwise, the mobile station selects the base station of the next highest pilot quality and returns to Step 2040 (Step 2100).

In an embodiment of the present invention, at Step 2080, the mobile station may simply retrieve the pilot quality measurement that had been obtained according to the acquisition and ranking steps of Steps 2010 and 2020. Having previously measured the quality of all pilot channels that were detectable, it is not necessary according to this embodiment for the mobile station to reacquire the pilot channel of the lightly loaded base station prior to attempting registration in Step 2090.

Optionally, however, according to other embodiments of the present invention, the mobile station may first monitor the congestion indicator of the lightly loaded base station prior to attempting registration. In this alternative, instead of advancing from Step 2080 to Step 2090, the mobile station may simply select the lightly loaded base station (Step 2110 in phantom) and return to step 2040. In this alternative, in addition to receiving the congestion indicator from the lightly loaded base station, the mobile station also may perform quality measurements upon the sync channel (step not shown). This alternate embodiment enjoys the additional advantage of permitting the mobile station to adapt to changing conditions in the communication system. If the lightly loaded base station experiences a sudden congestion event or if signal quality from the lightly loaded base station suddenly becomes unacceptable, the mobile station may determine not to attempt registration to that base station.

As described above, a congested base station may include an identifier of a lightly loaded base station in the system. The identifier may be represented as an integer representing the differential delay offset between the pilot of the congested base station and the lightly loaded base station. As described above, different base stations in a CDMA system typically transmit the same pilot signal but at large relative delay offsets. For example, adjacent base stations participating in the known IS95 cellular system transmit pilot channels that are shifted with respect to each other by an integer multiple of 64 pilot code chips. IS-95 specifies a "PNINCREMENT" setting that determines the shift incremented of the pilot codes. According to an embodiment of the present invention, the identifier of the lightly congested base station maybe transmitted as an increment identifier representing an integer number of these predetermined shifts. In such an embodiment, the mobile station may attempt to acquire a new pilot channel shifted with respect to the present base station's pilot channel by the increment identifier.

According to another embodiment of the present invention, the identifier optionally also may include a color code. If the mobile station receives a color code in the congestion indicator signal, it may receive the sync channel associated with any pilot received at the identified offset and compare a color code received therein with the identified color code. If the two color codes do not match, the mobile station may abort registration attempt and advance to step 2100 instead (step not shown).

The registration protocol of the present invention provides an important advantage of reducing signal interference in a CDMA cell. In the present invention, the mobile station makes a determination of which base station it will attempt to register with based upon administrative information transmitted by base stations. The mobile station does not begin transmission until it has determined which base station it will register with.

This technique reduces interference in a congested cell by eliminating the registration request and rejection messages that would otherwise be transmitted in the cell.

Thus, the present invention contributes to reduced interference in a CDMA system by providing registration decision making in mobile stations rather than base stations.

The subscriber controlled registration techniques of the present invention may find application in any of a number of CDMA communication systems. It may be integrated into the known IS-95 cellular communication protocol with minor modifications to the communication protocol of the IS-95 sync channel protocol. Further, it may be used in other CDMA communication systems such as the Tanlink communication system currently under development by the assignee of the present invention, Tantivy Communications, Inc. The Tanlink system is characterized as a "nomadic access" system. Mobile stations in present iterations of the Tanlink system typically possess directional antennae and register to one and only one base station. The subscriber controlled registration techniques of the present invention also may find application in other CDMA systems not described herein.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed:

1. A method for communication in a wireless code division multiple access (CDMA) communication system by a mobile station, the method comprising:
    receiving, by the mobile station, a first channel from a first base station, wherein the first channel includes an indication, wherein the indication has one of two states, wherein the base station transmits on forward link channels including a pilot channel, traffic channels and the first channel;
    receiving, by the mobile station, a communication from the first base station on a condition that the indication has a first state of the two states; and
    selecting, by the mobile station, a second base station based on received pilot signals from a plurality of base stations on a condition that the indication has a second state of the two states.

2. The method of claim 1 further comprising receiving, by the mobile station, a communication from the second base station on a condition that an indication received on a first channel of the second base station has a first state of the two states.

3. The method of claim 1 wherein the communication is associated with registration of the mobile station with the first base station.

4. The method of claim 1 wherein the first channel is a sync channel.

5. The method of claim 1 wherein the indication is a flag signal.

6. The method of claim 1 wherein the first channel, the pilot channel and the traffic channels have different CDMA codes.

7. A wireless code division multiple access (CDMA) mobile station comprising:
    a receiver is configured to receive a first channel from a first base station, wherein the first channel includes an indication, wherein the indication has one of two states, wherein the base station transmits on forward link channels including a pilot channel, traffic channels and the first channel;
    the receiver is further configured to receive a communication from the first base station on a condition that the indication has a first state of the two states; and
    a base station selector configured to select a second base station based on received pilot signals from a plurality of base stations on a condition that the indication has a second state of the two states.

8. The mobile station of claim 7 wherein the receive is further configured to receive a communication from the second base station on a condition that an indication received on a first channel of the second base station has a first state of the two states.

9. The mobile station of claim 7 wherein the communication is associated with registration of the mobile station with the first base station.

10. The mobile station of claim 7 wherein the first channel is a sync channel.

11. The mobile station of claim 7 wherein the indication is a flag signal.

12. The mobile station of claim 7 wherein the first channel, the pilot channel and the traffic channels have different CDMA codes.

13. A wireless code division multiple access (CDMA) base station comprising:

a transmitter is configured to transmit on forward link channels including a pilot channel, traffic channels and a first channel; wherein the first channel includes an indication, wherein the indication has one of two states;

the transmitter is further configured to transmit a communication to a mobile station on a condition that the indication has a first state of the two states; and the transmitter is further configured to not transmit a communication to the mobile station on a condition that the indication has a second state of the two states, wherein the second state indicates that the mobile station is to select a second base station based on received pilot signals from a plurality of base stations.

14. The base station of claim 13 wherein the communication is associated with registration of the mobile station with the base station.

15. The base station of claim 13 wherein the first channel is a sync channel.

16. The base station of claim 13 wherein the indication is a flag signal.

17. The base station of claim 13 wherein the first channel, the pilot channel and the traffic channels have different CDMA codes.

* * * * *

UNITED STATES PATENT AND TRADEMARK OFFICE
CERTIFICATE OF CORRECTION

PATENT NO. : 9,872,196 B2  
APPLICATION NO. : 15/245981  
DATED : January 16, 2018  
INVENTOR(S) : James A. Proctor, Jr. and Dennis D. Ferguson Page 1 of 1

It is certified that error appears in the above-identified patent and that said Letters Patent is hereby corrected as shown below:

In Column 6 at Line 63, change "wherein the receive" to -- wherein the receiver --.

Signed and Sealed this
Seventeenth Day of April, 2018

Andrei Iancu
*Director of the United States Patent and Trademark Office*